United States Patent
Martin et al.

(10) Patent No.: US 7,061,977 B2
(45) Date of Patent: Jun. 13, 2006

(54) APPARATUS AND METHOD FOR USING ADAPTIVE ALGORITHMS TO EXPLOIT SPARSITY IN TARGET WEIGHT VECTORS IN AN ADAPTIVE CHANNEL EQUALIZER

(75) Inventors: Richard K. Martin, Ithaca, NY (US);
Robert C. Williamson, Canberra (AU);
William A. Sethares, Cotuit, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 643 days.

(21) Appl. No.: 09/952,573

(22) Filed: Sep. 10, 2001

(65) Prior Publication Data

US 2002/0054634 A1    May 9, 2002

Related U.S. Application Data

(60) Provisional application No. 60/231,610, filed on Sep. 11, 2000, provisional application No. 60/262,506, filed on Jan. 18, 2001.

(51) Int. Cl.
*H03H 7/30* (2006.01)
*H03K 5/159* (2006.01)

(52) U.S. Cl. ............... 375/233; 375/234; 375/235; 455/203; 455/204

(58) Field of Classification Search ............... 375/229, 375/233, 232, 236; 455/203, 204
See application file for complete search history.

(56) References Cited

U.S. PATENT DOCUMENTS 4,027,257 A * 5/1977 Perreault .................. 333/18
4,141,072 A * 2/1979 Perreault .................. 702/124
5,526,378 A    6/1996 Knutson et al. ............ 375/229
6,426,972 B1 * 7/2002 Endres et al. ............... 375/229
6,477,200 B1 * 11/2002 Agazzi et al. ............... 375/233
2002/0086707 A1 * 7/2002 Struhsaker et al. ......... 455/561

FOREIGN PATENT DOCUMENTS

| EP | 0717559 | 6/1996 | .................. 5/21 |
| EP | 1014635 | 6/2000 | .................. 25/3 |

OTHER PUBLICATIONS

Myeong-Hwan Lee et al An adativre Channel Equalizer Based on Sign Permutation Filtering Framework, IEEE 1988, Multimedia Technology Center, Samsung Information Systems America Inc.*

Sato, "A Method of Self-Recovering Equalization for Multilevel Amplitude-Modulation", IEEE Communications Society Feb. 11, 1975.*

"Trellis-Coded Modulation with Redundant Signal Sets Part 1: Introduction", by Gottfried Ungerboeck, Feb. 1987, vol. 25, No. 2.

(Continued)

*Primary Examiner*—Jean B. Corrielus
*Assistant Examiner*—Qutub Ghulamali
(74) *Attorney, Agent, or Firm*—Larry Liberchuk

(57) ABSTRACT

An apparatus and method is disclosed for using adaptive algorithms to exploit sparsity in target weight vectors in an adaptive channel equalizer. An adaptive algorithm comprises a selected value of a prior and a selected value of a cost function. The present invention comprises algorithms adapted for calculating adaptive equalizer coefficients for sparse transmission channels. The present invention provides sparse algorithms in the form of a Sparse Least Mean Squares (LMS) algorithm and a Sparse Constant Modulus Algorithm (CMA) and a Sparse Decision Directed (DD) algorithm.

11 Claims, 6 Drawing Sheets

OTHER PUBLICATIONS

"Exponentiated Gradient versus Gradient Descent for Linear Predictors", by J. Kivinen et al., Information & Computation vol. 132, pp. 1-63.

"Riemannian Structure of Some New Gradient Descent Learning Algorithms", by Robert E. Mahony et al.

"Exploiting Sparsity in Equalization Algorithms", by Richard Martin et al, Aug. 15, 2000.

"Convergence of Exponentiated Gradient Algorithms", by Simon I. Hill et al.

"An Analysis of the Exponentiated Gradient Descent Algorithm" by Hill et al.; Fifth International Symposium on Signal Processing and its Applications, ISSPA '99, Brisbane, Australia, Aug. 22-25, 1999.

International Search Report dated Dec. 28, 2001.

* cited by examiner

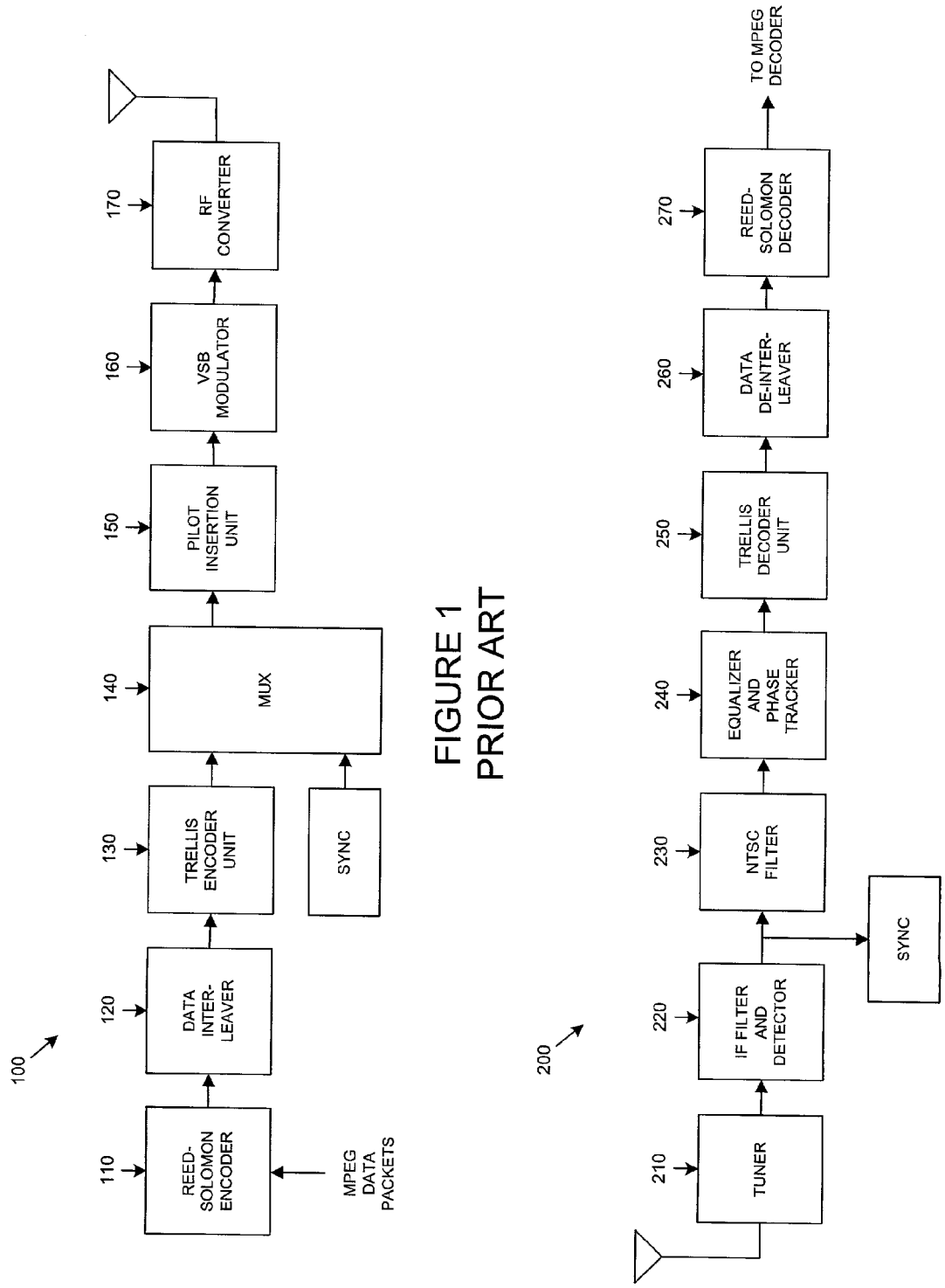

US 7,061,977 B2

APPARATUS AND METHOD FOR USING ADAPTIVE ALGORITHMS TO EXPLOIT SPARSITY IN TARGET WEIGHT VECTORS IN AN ADAPTIVE CHANNEL EQUALIZER

REFERENCE TO PROVISIONAL APPLICATIONS

This patent application refers to and claims the priority and benefit of Provisional Patent Application Ser. No. 60/231,610 filed Sep. 11, 2000 and Provisional Patent Application Ser. No. 60/262,506 filed Jan. 18, 2001.

TECHNICAL FIELD OF THE INVENTION

The present invention is directed, in general, to adaptive channel equalizers in digital communication devices and, more specifically, to an apparatus and method for using algorithms to exploit sparsity in target weight vectors in an adaptive channel equalizer.

BACKGROUND OF THE INVENTION

The Digital High Definition Television (HDTV) Grand Alliance (Grand Alliance) is a group of television manufacturing and research organizations in the television industry. After years of cooperative effort the Grand Alliance developed and proposed a standard for digital HDTV systems. The Grand Alliance standard has been adopted (with a few changes) by the Federal Communication Commission (FCC) as an official broadcasting standard for HDTV. The standard is known as the Advanced Television Systems Committee Digital Television Standard (the "ATSC Standard").

The ATSC Standard for HDTV transmission over terrestrial broadcast channels uses a signal that consists of a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is then broadcast.

The ATSC Standard calls for two (2) bit data symbols of the HDTV signal to be trellis encoded in accordance with an eight (8) level (i.e., a three (3) bit) one dimensional constellation. One bit of each data symbol is pre-coded, and the other is subjected to a ½ encoding rate that produces two coded bits in accordance with a four (4) state trellis code. For purposes of interleaving, twelve (12) identical encoders and pre-coders operate successively on every twelve successive data symbols. Symbols 0, 12, 24, 36, . . . are encoded as one series. Symbols 1, 13, 25, 37, . . . as a second series. Symbols 2, 14, 26, 38, . . . as a third series. And so on for a total of twelve (12) series. Therefore, the ATSC Standard requires twelve (12) trellis decoders in the HDTV receiver for the twelve (12) series of time division interleaved data symbols in the signal. Each trellis decoder in the HDTV receiver decodes every twelfth (12th) data symbol in the stream of coded data symbols.

In an ATSC Standard receiver trellis decoders are used to retrieve the original digital data that was trellis encoded just before being converted to 8-VSB symbols, modulated and broadcast. The use of trellis coding provides an improvement in the signal to noise ratio of the received signal, and the time multiplexing of twelve (12) independent streams reduces the possibility of co-channel interference from an analog NTSC broadcast signal residing on the same frequency. The abbreviation NTSC stands for National Television Standards Committee.

Each of the trellis decoders for the four (4) state trellis code operates in accordance with the well-known Viterbi decoding algorithm. Each of the decoders comprises a branch metric generator unit, an add-compare-select unit, and a path-memory unit. See, for example, "Trellis-coded Modulation With Redundant Signal Set, Part I, Introduction; Part II, State of the Art," by G. Ungerboeck, IEEE Communications Magazine, Vol. 25, pp. 5–21, February 1987.

In addition to being corrupted by noise, the transmitted signal is also subject to deterministic channel distortions and distortions caused by multipath interference. Consequently, an adaptive channel equalizer is generally used in front of the trellis decoders to compensate for these effects. The goal is to create a symbol stream that resembles, as much as possible, the symbol stream that was created by the twelve (12) trellis encoders at the transmitter.

One commonly used equalizer architecture makes use of a second equalizer known as a decision feedback equalizer (DFE). In this architecture, a conventional, or forward equalizer (FE) is supplemented by a DFE. The input to the DFE is an estimate of the original transmitted value of the current output symbol of the complete equalizer (FE and DFE). The output of the decision feedback equalizer (DFE) is subsequently added to the output of the forward equalizer (FE) to generate the output symbol. In a typical implementation, this estimate of the output symbol is obtained by simply "slicing" the equalizer output. The term "slicing" refers to the process of taking the allowed symbol value (of the eight (8) levels specified by the 8-VSB ATSC Standard) that is nearest to that of the actual output. Using the "sliced" symbols in a decision feedback equalizer (DFE) gives a near optimum error rate performance with low complexity. This approach, however, can suffer from error propagation caused by slicing errors. Because the typical symbol error rate after the equalizer for the HDTV signal can be up to twenty percent (20%), this can be a serious problem if the number of DFE filter taps is large.

After the equalizer, the HDTV signal is decoded in a trellis decoder that uses the Viterbi algorithm to decode the symbol stream based on the ½ rate trellis coding performed in the transmitter. As previously mentioned, the ATSC Standard specifies that twelve (12) trellis encoders and decoders are used in parallel in a time multiplexed fashion. Trellis decoding is then followed by byte de-interleaving and Reed Solomon decoding to further correct transmission errors in the signal.

Various prior art algorithms exist for computing the filter coefficients for adaptive equalizers. One commonly used method uses the well known least mean square (LMS) algorithm. The LMS algorithm is a successive approximation technique that uses the current coefficient and data tap values as well as the equalizer error to compute the new coefficient value. The LMS algorithm repeats the procedure until each filter coefficient converges to the desired optimum value.

In a typical LMS algorithm the coefficient vector is determined using the following formula:

$$C_{n+1} = C_n + \mu E \, d_n \qquad (2)$$

where $C_n$ is the coefficient vector at time n, $\mu$ is an adaptation speed constant, and $d_n$ is the data vector in the filter at time n. E is the error calculated from the output of the equalizer. E can be calculated in a decision directed fashion using the known training sequence embedded in the data stream. Alternatively, E can be calculated in a blind fashion using a Constant Modulus Algorithm (CMA) or a Decision Directed (DD) algorithm.

Transmission channels are often sparse. Optimally designed adaptive equalizers reflect the sparsity in the transmission channels. Typical prior art equalization methods such as the Least Mean Square (LMS) algorithm or the Constant Modulus Algorithm (CMA) or the Decision Directed (DD) algorithm do not exploit known "a priori" information for sparse transmission channels. Typical prior art approaches to exploiting sparsity attempt to reduce complexity. Complexity reduction is accomplished by only updating a subset of the channel model or equalizer taps.

Recently a prior art "exponentiated gradient" (EG) algorithm has been shown to have better performance than typical gradient methods when the target weight vector is sparse. See the article entitled "Exponentiated Gradient Versus Gradient Descent for Linear Predictors" by J. Kivinen and M. K. Warmuth in Information and Computation, 132(1), pp. 1–64, 1997. Unfortunately, the EG algorithm has several limitations that make it inappropriate for applications in communications and signal processing. For example, the EG algorithm does not decrease the required complexity.

There is therefore a need in the art for an apparatus and method for providing adaptive equalization algorithms capable of exploiting sparsity in target weight vectors in adaptive channel equalizers in general and in ATSC VSB receivers in particular.

SUMMARY OF THE INVENTION

To address the deficiencies of the prior art mentioned above, the apparatus and method of the present invention uses improved algorithms to exploit sparsity in target weight vectors in an adaptive channel equalizer.

The present invention uses information concerning known sparsities in a communication channel to calculate adaptive equalizer coefficients to increase a coefficient convergence rate for equalizer coefficients.

It is an object of the present invention to provide an apparatus and method for designing efficient adaptive channel equalizers.

It is another object of the present invention to provide an apparatus and method for using improved algorithms that are capable of exploiting sparsity in target weight vectors in an adaptive channel equalizer.

It is also an object of the present invention to provide an apparatus and method for providing a version of a least mean squares algorithm that is capable of exploiting sparsity in target weight vectors in an adaptive channel equalizer.

It is another object of the present invention to provide an apparatus and method for providing a version of a constant modulus algorithm that is capable of exploiting sparsity in target weight vectors in an adaptive channel equalizer.

It is also an object of the present invention to provide an apparatus and method for providing a version of a decision directed algorithm that is capable of exploiting sparsity in target weight vectors in an adaptive channel equalizer.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 1 illustrates a block diagram of an exemplary high definition television (HDTV) transmitter;

FIG. 2 illustrates a block diagram of an exemplary high definition television (HDTV) receiver;

DETAILED DESCRIPTION OF THE INVENTION

Figure 3:
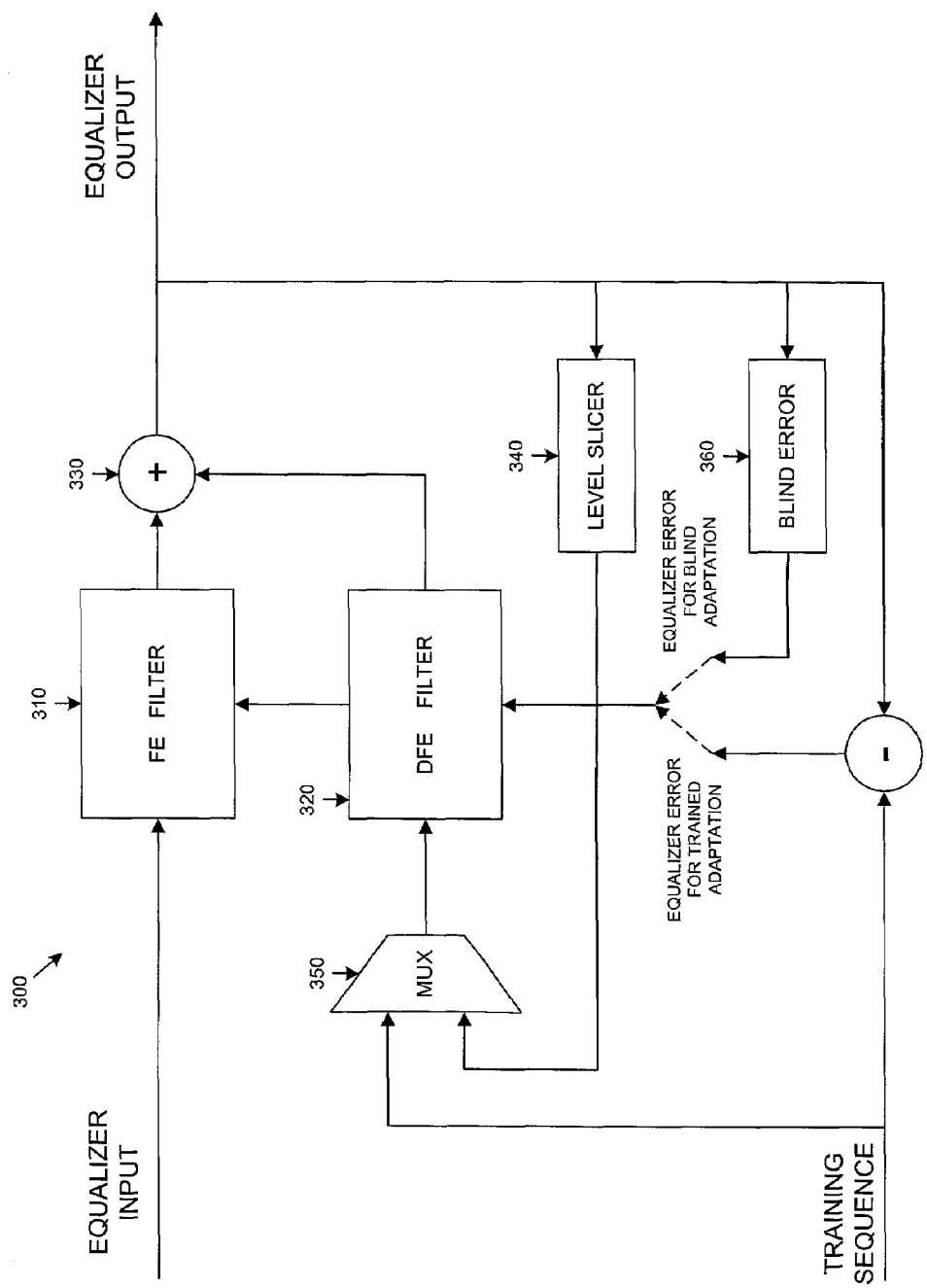
FIG. 3 illustrates a block diagram of an adaptive channel equalizer comprising a forward equalizer (FE) filter and a decision feedback equalizer (DFE) filter.

FIGS. 1 through 7, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a high definition television system. Those skilled in the art will recognize that the exemplary embodiment of the present invention may easily be modified for use in other similar types of systems to use an improved algorithm of the present invention to exploit sparsity in target weight vectors in an adaptive channel equalizer.

FIG. 1 illustrates a block diagram of an exemplary high definition television (HDTV) transmitter 100. MPEG compatible data packets are encoded for forward error correction (FEC) by a Reed Solomon (RS) encoder 110. The data packets in successive segments of each data field are then interleaved by data interleaver 120, and the interleaved data packets are then further interleaved and encoded by trellis encoder unit 130. Trellis encoder unit 130 produces a stream of data symbols representing three (3) bits for each symbol. One of the three bits is pre-coded and the other two bits are produced by a four (4) state trellis encoding.

Trellis encoder unit 130 comprises twelve (12) parallel trellis encoder and pre-coder units to provide twelve interleaved coded data sequences. The encoded three (3) bits of each trellis encoder and pre-coder unit are combined with field and segment synchronization bit sequences in multiplexer 140. A pilot signal is inserted by pilot insertion unit 150. The data stream is then subjected to vestigial sideband (VSB) suppressed carrier eight (8) level modulation by VSB modulator 160. The data stream is then finally up-converted to a radio frequency by radio frequency (RF) by converter 170.

FIG. 2 illustrates a block diagram of an exemplary high definition television (HDTV) receiver 200. The received RF signal is down-converted to an intermediate frequency (IF) by tuner 210. The signal is then filtered and converted to digital form by IF filter and detector 220. The detected signal is then in the form of a stream of data symbols that each signify a level in an eight (8) level constellation. The signal is then filtered by NTSC rejection filter 230 and subjected to equalization and phase tracking by equalizer and phase tracker unit 240. The recovered encoded data symbols are then subjected to trellis decoding by trellis decoder unit 250. The decoded data symbols are then further de-interleaved by data de-interleaver 260. The data symbols are then subjected to Reed-Solomon decoding by Reed Solomon decoder 270. This recovers the MPEG compatible data packets transmitted by transmitter 100.

A schematic representation of computer diskette 280 is also shown in FIG. 2. In an alternate advantageous embodiment of the present invention, computer diskette 280 may be inserted into a computer disk drive (not shown) in television receiver 200. The computer disk drive is capable of receiving signal information relating to target weight vectors in an adaptive channel equalizer of television receiver 200 and writing the signal information to computer diskette 280. In another alternate advantageous embodiment of the present invention, computer diskette 280 contains computer executable method steps for implementing the method of the present invention. Computer diskette 280 may be considered as a representation of any type of medium that is capable of storing and sending computerized data and instruction.

FIG. 3 illustrates a block diagram of a prior art adaptive channel equalizer 300 for use in equalizer and phase tracker unit 240. Prior art adaptive channel equalizer unit 300 comprises a forward equalizer (FE) filter 310 and a decision feedback equalizer (DFE) filter 320. The output from forward equalizer (FE) filter 310 is added to the output from decision feedback equalizer (DFE) filter 320 in adder unit 330 to form the output of adaptive channel equalizer unit 300.

Forward equalizer (FE) filter 310 accepts the uncompensated channel symbol data as its input. In contrast, decision feedback equalizer (DFE) filter 320 requires for its input an "estimate" of the symbol that was transmitted over the channel before the symbol was corrupted by noise.

As is well known, DFE filter 320 can receive an estimate of the output symbol by simply "slicing" the equalizer output. The term "slicing" refers to the process of taking the allowed symbol value (of the eight (8) levels specified by the 8-VSB ATSC Standard) that is nearest to that of the actual output. In the embodiment shown in FIG. 3, level slicer 340 provides the "sliced" symbols to DFE filter 320 through multiplexer 350. This method of providing estimates of the output symbols to DFE filter 320 can suffer from error propagation caused by slicing errors.

As is also well known, DFE filter 320 can be adapted either in a "trained mode" or in a "blind" mode. In the "trained model" DFE filter 320 receives a "training sequence" of known symbols (through multiplexer 350) at a certain known time. DFE filter 320 compares the known training sequence with the "equalizer error for trained adaptation." The equalizer error for trained adaptation is obtained by subtracting the equalizer output from the known training sequence. DFE filter 320 then adjusts its operation to cause the equalizer output to match the known sequence of training signals.

Alternatively, DFE filter 320 can operate in a "blind mode." In the "blind mode" DFE filter 320 receives an "equalizer error for blind adaptation" from blind error unit 360. Blind error unit 360 compares the equalizer output with an expected statistical distribution of the data to generate the equalizer error blind adaptation. DFE filter 320 then adjusts its operation to cause the equalizer output to match the expected statistical distribution of the data.

Figure 4:
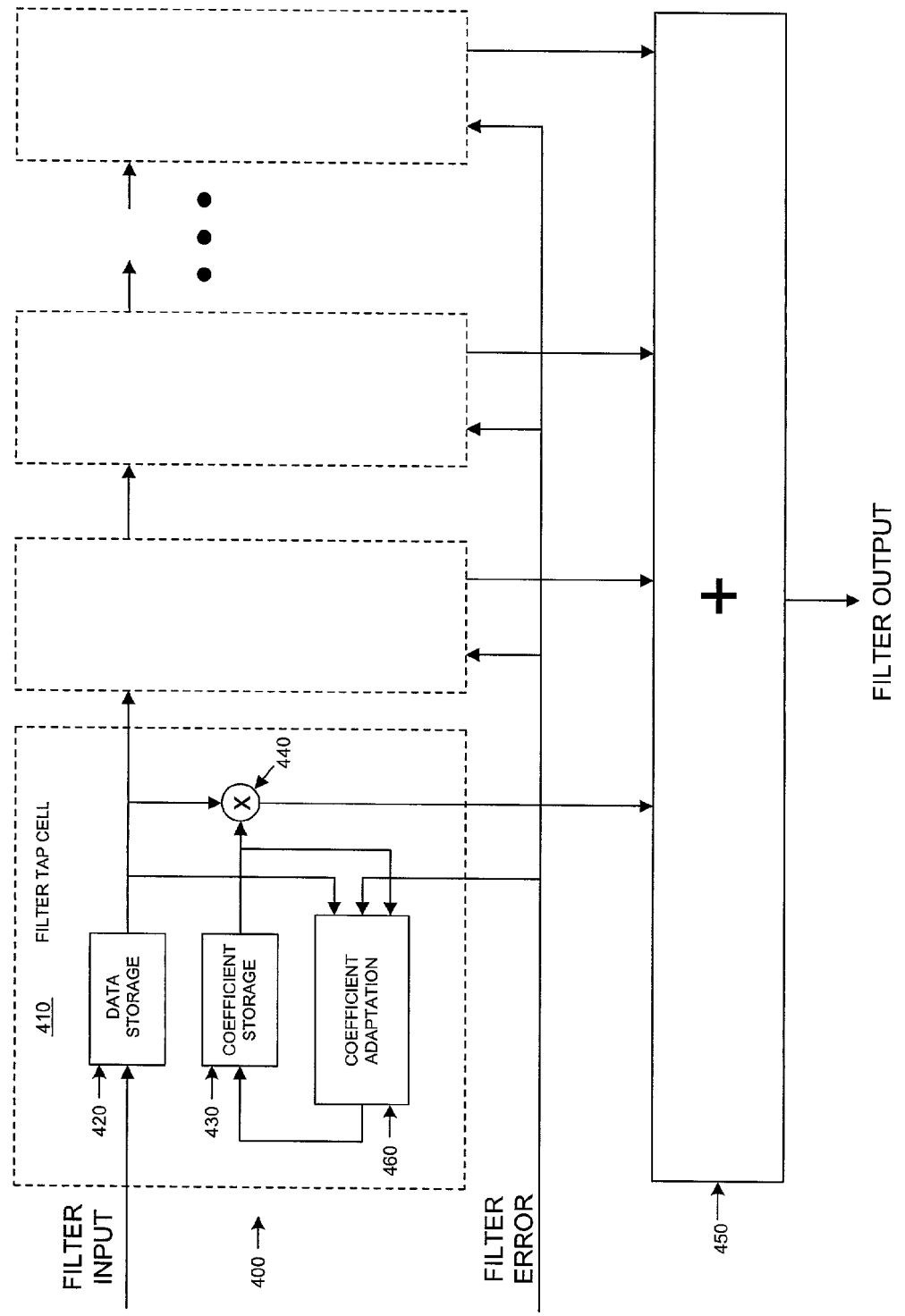
FIG. 4 illustrates a block diagram of an adaptive finite impulse response (FIR) filter for use in an adaptive channel equalizer.

FIG. 4 Illustrates a conventional adaptive finite impulse response (FIR) filter 400 for use in forward equalizer (FE) filter 310 and in decision feedback equalizer (DFE) filter 320. The coefficients of FIR filter 400 are computed to compensate as much as possible for channel distortions. The length of FIR filter 400 corresponds to the maximum impairment delay that FIR filter 400 is designed to correct for.

FIR filter 400 comprises a number of filter tap cells 410 (also referred to as "filter taps"). Each filter tap 410 comprises a data storage register 420, a coefficient storage register 430, and multiplier 440. The output of multiplier 440 is input to an adder unit 450. Adder unit 450 sums all of the weighted tap values to generate a filter output. Filter tap 410 also comprises a coefficient adaptation unit 460 that computes the updated filter coefficients. The coefficient adaptation unit 460 has the following inputs: (1) the current coefficient value, (2) the data tap value, and (3) a measure of the equalizer error (i.e., the difference between the expected signal value and the actual output signal value). The coefficient adaptation unit 460 operates only when the adaptation process is being performed.

A commonly used method of computing the filter coefficients uses the well known least mean square (LMS) algorithm. The LMS algorithm is a successive approximation technique that uses the current coefficient and data tap values as well as the equalizer error to compute the new coefficient value. The LMS algorithm repeats the procedure until each filter coefficient converges to the desired optimum value.

In a typical LMS algorithm the coefficient vector is determined using the following formula:

$$C_{n+1} = C_n + \mu E\, d_n \quad (2)$$

where $C_n$ is the coefficient vector at time n, $\mu$ is an adaptation speed constant, and $d_n$ is the data vector in the filter at time n. E is the error calculated from the output of the equalizer. E can be calculated in a decision directed fashion using the known training sequence embedded in the data stream. Alternatively, E can be calculated in a blind fashion using a Constant Modulus Algorithm (CMA) or a Decision Directed (DD) algorithm.

Figure 5:
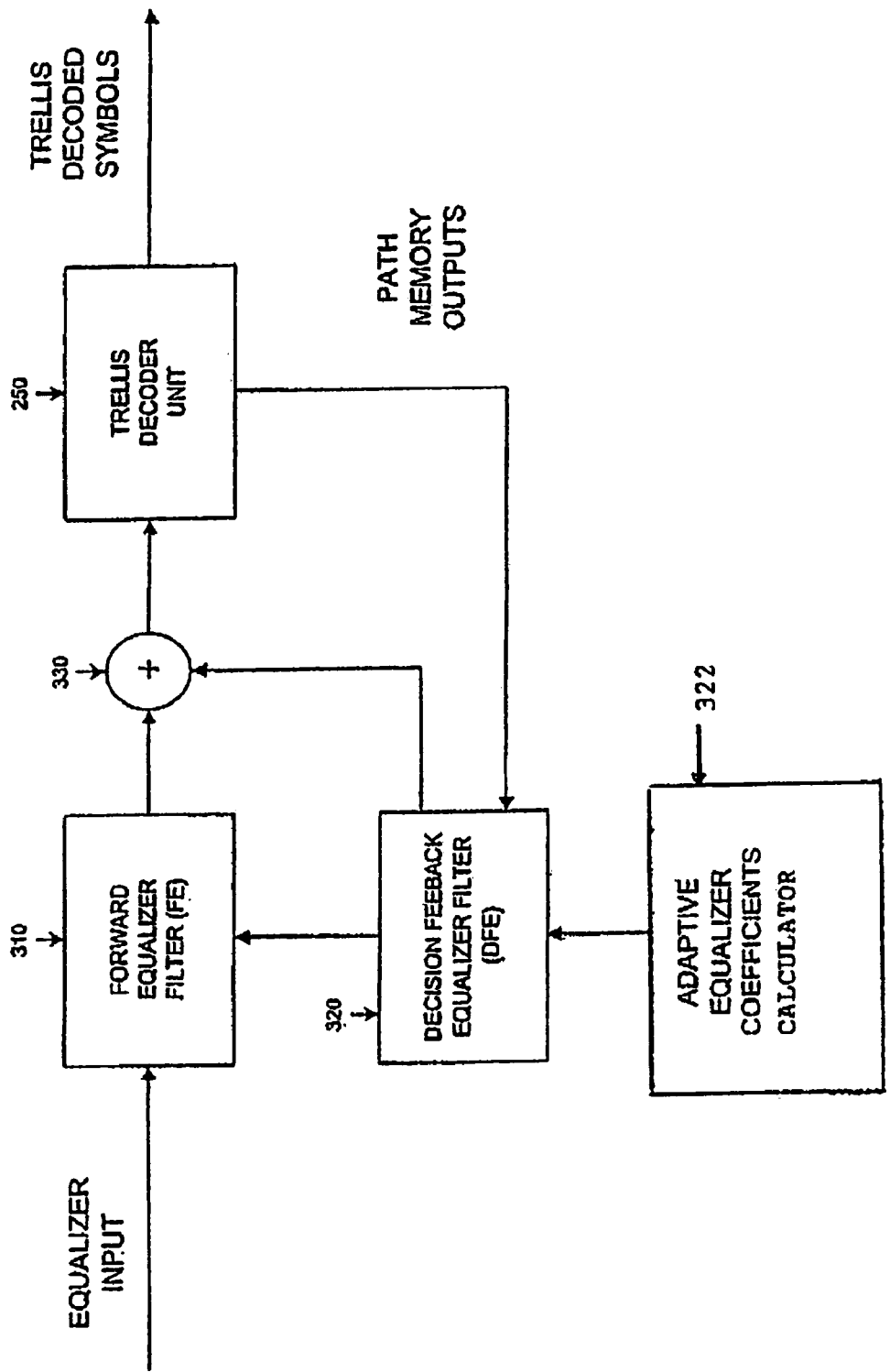
FIG. 5 illustrates a block diagram showing the connection of a forward equalizer (FE) filter to a trellis decoder unit and the connection of the trellis decoder unit to a decision feedback equalizer (DFE) filter.

FIG. 5 illustrates a block diagram showing the connection of forward equalizer (FE) filter 310 to trellis decoder unit 250 and the connection of trellis decoder unit 250 to decision feedback equalizer (DFE) filter 320. The output from forward equalizer (FE) filter 310 is added to the output from decision feedback equalizer (DFE) filter 320 in adder unit 330 to form the input to trellis decoder unit 250. The path memory outputs from trellis decoder unit 250 are fed back to decision feedback equalizer (DFE) filter 320. Information from the path memory outputs is used to reduce errors in decision feedback equalizer (DFE) filter 320.

The apparatus and method of the present invention provides improved algorithms for computing adaptive equalizer coefficients. The improved algorithms of the present invention may be used in a variety of different equalizer circuits. In the exemplary equalizer circuit illustrated in FIG. 5, the improved algorithms of the present invention generated at device 322 may be used to calculate the adaptive equalizer coefficients that are provided to decision feedback equalizer (DFE) 320. It is understood that the equalizer circuit illustrated in FIG. 5 is shown as an example. The improved algorithms of the present invention are not limited to use only in the equalizer circuit shown in FIG. 5.

The algorithms of the present invention operate in equalizer circuits that are designed for sparse transmission channels. Prior art equalizer circuits use a class of algorithms that are designed to exploit sparsity in target weight vectors. However, the prior art algorithms are designed with the assumptions that (1) a training sequence is available, and (2) the weights are positive, and (3) the weights sum to unity.

The improved algorithms of the present invention do not make these assumptions. Therefore, the improved algorithms of the present invention are better able to exploit known sparsities in target weight vectors in an adaptive channel equalizer.

One prior art algorithm is an "exponentiated gradient" (EG) algorithm. The EG algorithm has recently been shown to have better performance than typical gradient methods when the target weight vector is sparse. See the article entitled "Exponentiated Gradient Versus Gradient Descent for Linear Predictors" by J. Kivinen and M. K. Warmuth in Information and Computation, 132(1), pp. 1–64, 1997. Unfortunately, the EG algorithm has several limitations that make it inappropriate for applications in communications and signal processing. For example, the EG algorithm does not decrease the required complexity. In addition, the EG algorithm also makes the assumptions (1) through (3) mentioned above.

The background of the improved algorithms of the present invention may be understood by reviewing the work of R. E. Mahony and R. C. Williamson, published in an article entitled "Riemannian Structure of Some New Gradient Descent Learning Algorithms", Proceedings of IEEE 2000 Symposium on Adaptive Systems for Signal Processing, Communication and Control, pp. 197–202, 2000. This paper provides a general discussion concerning methods for encoding prior knowledge into learning algorithms using a geometric "preferential structure." The main concept involves defining a metric so that the algorithm evolves over an error surface that is shaped to incorporate the known prior information. For instance, if the $i^{th}$ component is known to be reliable while the $j^{th}$ component is not, then the algorithm should take larger steps in the $j^{th}$ direction. This is accomplished by warping the underlying space, in effect augmenting or diminishing the stepsizes of the algorithm in the desired direction.

Mathematically, the preferential metric is a family of functions $\phi_i(w^i)$ that represent the known "a priori" knowledge (the Bayesian "prior") of the $i^{th}$ parameter (or weight) $w^i$. The "natural gradient" (NG) algorithm is then shown to be:

$$w_{k+1}^j = \Phi_i^{-1}\left(\Phi_i(w_k^j) - \mu \frac{\partial L}{\partial w_k^j} \frac{1}{\phi_i(w_k^j)}\right) \quad (1)$$

where L represents the "cost function" that is to be minimized, and where $\Phi$ is the indefinite integral of $\phi$.

Unfortunately, the updates of the NG algorithm set forth in Equation (1) can be quite complicated due to the presence of the nonlinearities $\Phi$ and $\Phi^{-1}$. A more useful method can be derived as a first order approximation to Equation (1) by using the Taylor series, which results in the new update equation:

$$w_{k+1}^j = w_k^j - \mu \frac{\partial L}{\partial w_k^j} \frac{1}{\phi_i^2(w_k^j)} \quad (2)$$

The method represented by Equation (2) is referred to as the "approximate natural gradient" (ANG) method. More detailed information on the derivation of the ANG method is provided in an article entitled "Exploiting Sparsity in Equalization Algorithms," by R. K. Martin, W. A. Sethares, and R. C. Williamson, Cornell University Technical Report XX-2000.

By making suitable choices for the cost function L and the priors $\phi$, it is possible to create adaptive methods specifically designed to exploit the sparsity and information structure of the weights. The present invention comprises a new series of algorithms based on different choices of cost functions and priors. A practical method of choosing appropriate priors for particular applications (such as an 8-VSB HDTV equalizer) will be discussed later.

Prior information about a target weight vector may arise from first principles. For instance, a channel may be known to be sparse because it consists of a number of discrete reflections well separated in space or time. Prior knowledge may also arise as a result of a statistical study showing, for example, that a particular equalizer often converges to a configuration in which most taps are near zero. However it arises, it will be necessary to model the "a priori" information in simple functional form in order to utilize it in algorithm design.

Suppose that a database of target weight vectors is available. The strategy is to create a histogram of all of the equalizer coefficients of all of the gathered channel data. In accordance with the expectations of sparsity, this has the form of a small number of large taps and a large number of small taps. It is then necessary to fit a parameterized curve to the histogram. This function will be a good candidate for the prior $\phi$.

Suppose, for instance, that a prior form of:

$$\phi(w) = \frac{1}{\sqrt{|w|^\alpha + \varepsilon}} \qquad (3)$$

appears to fit well. In Equation (3), $\phi(w)$ is large for small w and small for large w. The term $\alpha$ quantifies how the histograms decay. Observe that the absolute values allow w to take on both positive and negative values, while the $\varepsilon$ term insures that the algorithm does not become trapped at or near zero.

The following relationship between the priors $\phi$ and the cost function L may be demonstrated.

Proposition One. Let $\phi$, $\gamma$, and $L(y, \hat{y})$ represent the priors, parameterizations and cost function of an ANG algorithm as set forth in Equation (2) wherein $\hat{y}$ is parameterized as:

$$\hat{y}_k = \sum_i \gamma(w_k^i) x_k^i \qquad (4)$$

where $x_k$ is the measured input data, and the function $\gamma(w_k^i)$ is invertible (at least over its domain). If there are functions $\bar{\gamma}$ and $\bar{\phi}$ with:

$$\frac{\dot{\gamma}^2}{\phi^2} = \frac{\dot{\bar{\gamma}}^2}{\bar{\phi}^2}, \qquad (5)$$

then $\bar{\gamma}$, $\bar{\phi}$, and $L(y, \hat{y})$ are an alternate set of priors, parameterizations and cost function for the same ANG algorithm.

In particular, the ANG algorithm may be derivable from an alternative prior $\phi$ using the standard parameterization $\gamma(w)=w$. This prior will be called the "true" prior because it represents the prior beliefs without the confounding influence of the reparameterization function. Alternatively, the ANG algorithm may be derivable from a reparameterization using the standard prior $\phi=1$ (which corresponds to a belief that all values of the parameter are equally likely). In this case, $\gamma$ can be used to give the cost function over which the algorithm is evolving under the standard Euclidean gradient. These are useful because sometimes it is easier to understand the behavior of an algorithm from the point of view of priors, while sometimes it is easier from the perspective of the cost function. The requirement that the expression $\dot{\gamma}^2$ divided by $\phi^2$ be equal allows translation of the same algorithm to both frameworks.

Therefore the prior function in Equation (3) with $\gamma(w)=w$ and $\alpha=1$ corresponds to a cost function L with parameterization $$\gamma(w) = \frac{1}{4} sgn(w) |w|^2 + \sqrt{\varepsilon} w \qquad (6)$$

and a prior of $\phi(w)=1$. Either point of view is valid and both lead to the same update rule. The first point of view is needed to easily determine what the prior ought to be, while the latter is needed to easily write down the appropriate ANG algorithm.

This section derives and describes the improved algorithms of the present invention. In most cases, the ANG algorithm set forth in Equation (2), and the cost function for the equivalent Euclidean gradient (corresponding to $\phi=1$), and the true prior (corresponding to $\gamma(w)=w$) are given. The new algorithms include a version of LMS specifically designed for sparse applications, as well as blind CMA and DD algorithms that similarly exploit prior information about the target weight vector.

Algorithm One. Sparse LMS.

Using the standard MSE cost function:

$$L(y_k, \hat{y}_k) = \frac{1}{2}(y_k - \hat{y}_k)^2 \qquad (7)$$

with the parameterization set forth in Equation (6), and with prior $\phi(w)=1$ gives the ANG algorithm:

$$w_{k+1}^j = w_k^j + \mu(y_k - \hat{y}_k)x_k^j(|w_k^j| + \varepsilon) \qquad (8)$$

When $\alpha=1$ the ANG algorithm in Equation (8) will also be obtained using the prior set forth in Equation (3) and the cost function $\gamma(w)=w$. Observe that the only difference between the ANG algorithm in Equation (8) and the standard LMS is the presence of the term $w_k^j$ multiplying the stepsize. In essence, when the current estimate of $w_k^j$ is small, the update is small, and when the current estimate of $w_k^j$ is large, the update is large. This explains in a simple, intuitive way, why the algorithm will tend to perform better in sparse environments. It takes large steps when the data appears unreliable (i.e., when it differs from the prior) and it takes small steps when the data appears to be reliable (i.e., when it reinforces the prior).

All of the above derivations occur for individual weights. Hence, if different priors are available for different weights, then different algorithm updates can be used. This might be useful, for example, in an equalizer design problem where the center taps are likely to be large while the tails of the equalizer are likely to be small and sparse.

Algorithm Two. Blind Adaptation with Sparse CMA

In many communications problems the transmitted signal consists of elements taken from a finite alphabet. This property can be exploited to direct the adaptation. One popular method is the Constant Modulus Algorithm (CMA) with cost function $$L(y_k, \hat{y}_k) = \frac{1}{4}(\hat{y}_k^2 - c)^2 \qquad (9)$$

where c is a constant appropriate for the given constellation. The most useful aspect of Equation (9) is that it leads to algorithms that are independent of $y_k$ and that can be used to adapt the weights even in the absence of a training signal. Such algorithms are referred to as "blind" algorithms. This section will show how the NG and ANG strategies, in combination with Equation (9), can be used to derive blind algorithms in which the updates are explicitly designed to exploit prior knowledge about the weights.

The simplest case is the uniform prior $\phi(w)=1$ which corresponds to $\Phi(w)=1$ and $\Phi^{-1}(z)=z$. This leads to the NG algorithm:

$$w_{k+1}^i = w_k^i - \mu \hat{y}_k (\hat{y}_k^2 - c) x_k^i \qquad (10)$$

Using Equation (2) leads to an ANG algorithm that is of exactly the same form. In fact, Equation (10) is a standard CMA algorithm.

Suppose, however, that prior knowledge suggests a prior as set forth in Equation (3). Then the ANG algorithm becomes:

$$w_{k+1}^i = w_k^i - \mu \hat{y}_k (\hat{y}_k^2 - c) x_k^i (|w_k^i|^\alpha + \varepsilon w) \qquad (11)$$

Of course, other priors will lead in similar fashion to other update rules.

Variations on $L(y_k, \hat{y}_k)$ may also be made. One such variation generalizes Equation (9) to:

$$L(y_k, \hat{y}_k) = \frac{1}{pq} ||\hat{y}_k|^p - c|^q \qquad (12)$$

where P and q take on various values. This can be combined with prior information leading to a generalized CMA for sparsity in its NG form or in its simpler ANG form. The simpler ANG form is:

$$w_{k+1}^i = w_k^i - \mu |\hat{y}_k|^{p-1} ||\hat{y}_k|^p - c|^{q-1} x_k^i (|w_k^i|^\alpha + \varepsilon) \qquad (13)$$

with the true prior:

$$\phi(w) = \frac{1}{\sqrt{|w|^\alpha + \varepsilon}} \qquad (14)$$

All of the algorithms can also be generalized readily to the complex case. All of the algorithms may be designed so that different weights have different priors and different update rules matched to those priors.

Algorithm Three. Blind Adaptation with Sparse DD

Another important class of algorithms are "decision directed", blind algorithms designed for use with a finite alphabet. The DD algorithm can be viewed as Euclidean descent over the cost function $$L(y_k, \hat{y}_k) = \frac{1}{2}(Q(\hat{y}_k) - \hat{y}_k)^2 \qquad (15)$$

where the function Q quantizes the argument to the nearest symbol in the alphabet. In such a derivation it is necessary to ignore the fact that the function Q is discontinuous and to formally replace its derivative with zero.

The simplest case is the uniform prior $\phi(w)=1$ and standard parameterization $\phi(w)=w$. This leads to the NG algorithm:

$$w_{k+1}^i = w_k^i - \mu(Q(\hat{y}_k) - \hat{y}_k) x_k^i \qquad (16)$$

Using Equation (2) leads to an ANG algorithm that has the same form. Equation (16) is a standard DD algorithm.

For the fractional power priors $$\phi(w) = \frac{1}{\sqrt{|w|^\alpha + \varepsilon}} \qquad (17)$$

and the standard parameterization, the ANG algorithm is $$w_{k+1}^i = w_k^i - \mu(Q(\hat{y}_k) - \hat{y}_k) x_k^i (|w_k^i|^\alpha + \varepsilon) \qquad (18)$$

Equation (18) corresponds to a Euclidean descent on a cost function defined by Equation (15) with the reparameterization defined by Equation (6). Other priors lead in analogous fashion to other update rules and to other modifications. For example, the exponential power of two (2) in Equation (15) may be replaced with some other exponential power.

Algorithm Performance.

A fair amount of theoretical evidence exists that this kind of exploitation of prior information leads to more rapid convergence. See, for example, R. E. Mahony and R. C. Williamson, "Riemannian Structure of Some New Gradient Descent Learning Algorithms", Proceedings of IEEE 2000 Symposium on Adaptive Systems for Signal Processing, Communication and Control, pp. 197–202, 2000, and S. I. Hill, and R. C. Williamson, "Convergence of Exponentiated Gradient Algorithms," submitted September 1999 for publication in IEEE Transactions on Signal Processing.

Figure 6:
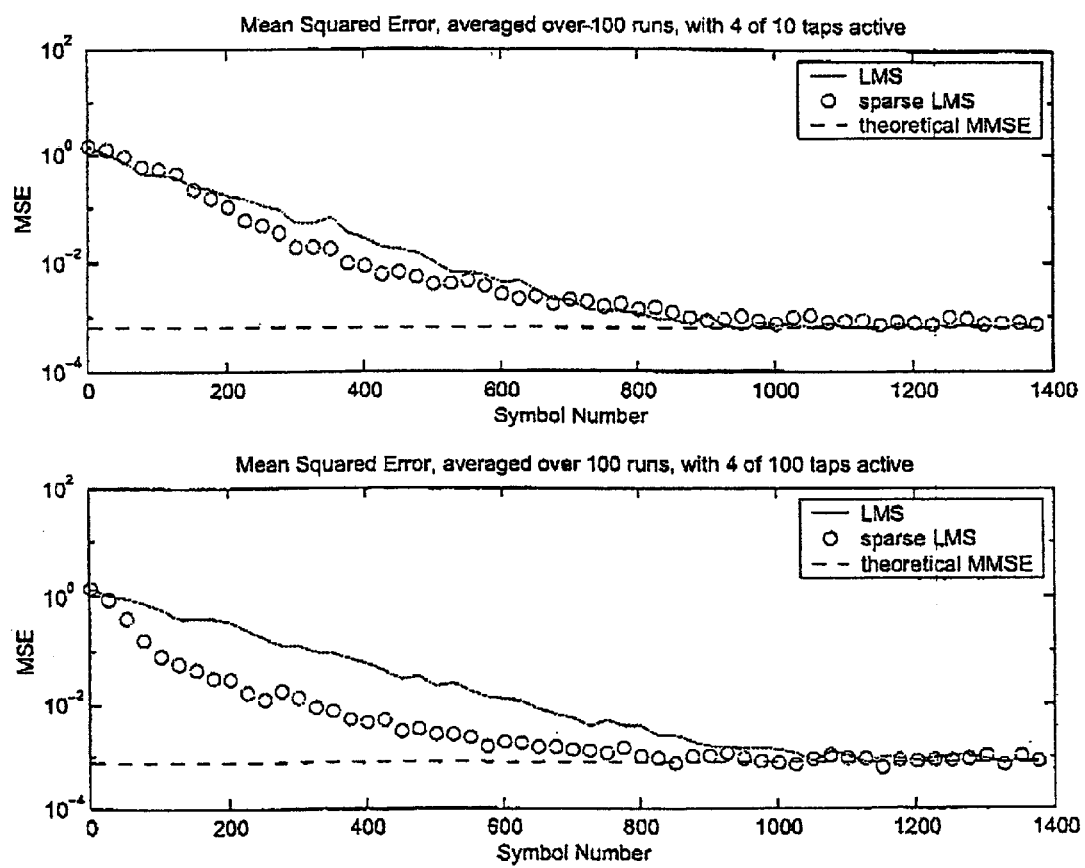
FIG. 6 illustrates a graph showing the Mean Squared Error (MSE) versus time for a Least Mean Squares (LMS) algorithm and for a Sparse Least Mean Squares (LMS) algorithm.

FIG. 6 sets forth experimental performance curves in several system identifications scenarios that compare the performance of the LMS algorithm to that of the Sparse LMS algorithm. The comparison was made in terms of Mean Squared Error (MSE), convergence rates, and tracking ability. To ensure that the comparisons were fair, the stepsizes were chosen to equate the MSE after convergence. The convergence rates of the two algorithms were compared via simulations. The sparsity is exploited in a completely known setting in order to give an idea as to the kinds of improvements that are possible.

The simulations were run in a sparse environment. The first channel had ten taps, with non-zero taps of values [0.1, 1.0, −0.5, 0.1] located in positions [1, 3, 4, 8]. The second channel had one hundred (100) taps, with not-zero taps of the same values located in positions [1, 30, 35, 85]. Zero initializations were used. The stepsizes were chosen so that the MSE at convergence would be the same, leading to $\mu=0.0050$, $\mu_{sparse}=0.0215$ for channel No. 1 and $\mu_{sparse}=0.0629$ for channel No. 2. The noise power was $(0.0215)^2$ and the value of $\epsilon$ for Sparse LMS was one sixteenth (1/16).

FIG. 6 shows the MSE versus time for both the LMS algorithm and for the Sparse LMS algorithm. The MSE was computed by taking the ensemble average of each algorithm over one hundred (100) runs. It is clear that if the environment is sufficiently sparse, the sparse version of LMS achieves a much faster convergence rate.

Figure 7:
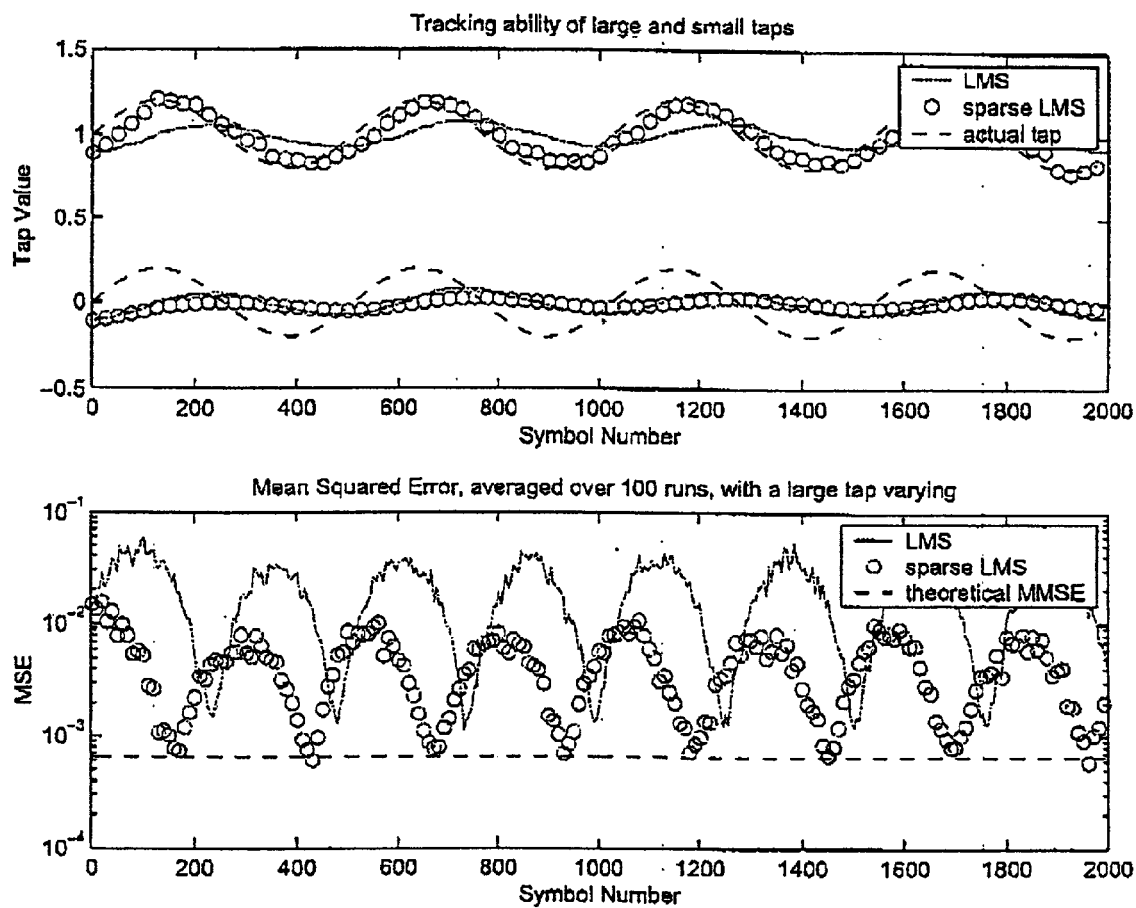
FIG. 7 illustrates a graph showing the tracking ability of a Least Mean Squares (LMS) algorithm and a Sparse Least Mean Squares (LMS) algorithm.

FIG. 7 shows the tracking ability of the two algorithms. The simulation was run on a twenty (20) tap channel with two (2) taps set to vary sinusoidally in time. The actual channel consisted of the first channel from FIG. 6 with ten (10) zeros appended. Then taps fifteen (15) and sixteen (16) were set to vary as $1+0.2 \sin(\pi/256\, k)$ and $0.2 \sin(\pi/256\, k)$, respectively, where k is the iteration number. Again the stepsizes were chosen to equalize the MSE.

The upper plot in FIG. 7 shows the values of the actual taps and both estimates as both a small and a large tap fluctuate. The Sparse LMS is better at tracking large taps, but not small taps. This is because its effective stepsize becomes small near zero. The lower plot shows the MSE for both algorithms when only the larger tap is fluctuating. Since Sparse LMS is better at tracking the large tap, the MSE does not suffer as much as for regular LMS.

The LMS algorithm and a wide range of variants have been derived through the framework of the Natural Gradient class of algorithms. In a similar fashion, other algorithms (such as CMA and DD-LMS) and their variants have been derived. Using the concepts of reparameterization and priors, it has been shown how to exploit prior knowledge of the system's distribution, with particular attention to the case of a sparse distribution of taps.

In cases where prior knowledge exists (such as in the 8-VSB equalizer problem) there is compelling evidence for the adoption of algorithms specially designed to exploit that knowledge.

While the present invention has been described in detail with respect to certain embodiments thereof, those skilled in the art should understand that they can make various changes, substitutions modifications, alterations, and adaptations in the present invention without departing from the concept and scope of the invention in its broadest form.

What is claimed is:

1. In a digital communication system an apparatus for calculating adaptive equalizer coefficients comprising:
    means for using an algorithm that exploits sparsities in target weight vectors in an adaptive channel equalizer to increase a convergence rate of at least one adaptive equalizer coefficient, wherein said means for using said algorithm further includes any one of;
    means for providing a sparse least mean square algorithm of the form $$w_{k+1}^i = w_k^i + \mu(y_k - \hat{y}_k)x_k^i(|w_k^i| + \varepsilon)$$

where $w_k^i$ is the $i^{th}$ weight vector at time k, and where $w_{k+1}^i$ is the $i^{th}$ weight vector at time k+1, and where $\mu$ is the stepsize, and where $\hat{y}_k$ is a received signal at time k after passing through filter w, and where $(\hat{y}_k-c)$ is a calculated error at time k, and where $x_k^i$ is the $i^{th}$ value of received signal at time k, and where $(|w_k^i|^\alpha+\epsilon w)$ is a measure of sparsity contribution specified by a cost function:
    means for providing a sparse constant modulus algorithm of the form $$w_{k+1}^i = w_k^i - \mu \hat{y}_k(\hat{y}_k - c)x_k^i(|w_k^i|^\alpha + \varepsilon w)$$

where $w_k^i$ is the $i^{th}$ is the weight vector at time k, and where $w_{k+1}^i$ is the $i^{th}$ weight vector at time k+1, and where $\mu$ is the stepsize, and where $\hat{y}_k$ is a received signal at time k after passing through filter w, and where $(\hat{y}_k-c)$ is a calculated error at time k, and where $x_k^i$ is the $i^{th}$ value of received signal at time k, and where $(|w_k^i|^\alpha+\epsilon w)$ is a measure of sparsity contribution specified by a cost function; and
    means for providing a sparse decision directed algorithm of the form $$w_{k+1}^i = w_k^i - \mu(Q(\hat{y}_k) - \hat{y}_k)x_k^i(|w_k^i|^\alpha + \varepsilon)$$

where $w_k^i$ is the $i^{th}$ weight vector at time k, and where $w_{k+1}^i$ is the $i^{th}$ weight vector at time k+1, and where $\mu$ is the stepsize, and where $\hat{y}_k$ is a received signal at time k after passing through filter w, and where $Q(\hat{y}_k)$ is a quantization of $\hat{y}_k$, and where $(Q(\hat{y}_k)-\hat{y}_k)$ is a calculated error at time k, and where $x_k^i$ is the $i^{th}$ value of received signal at time k, and where $(|w_k^i|^\alpha+\epsilon)$ is a measure of sparsity contribution specified by a cost function.

2. The apparatus as claimed in claim 1 wherein said algorithm utilizes one of a selected value of a prior information and a selected value of a cost function.

3. A television receiver for receiving and calculating adaptive equalizer coefficients comprising:
    means that uses an algorithm that exploits sparsities in target weight vectors in an adaptive channel equalizer to increase a convergence rate of at least one adaptive equalizer coefficient; and
    means for exploiting target weight vectors, without assuming the weights are positive and without assuming that weights sum to unity.

4. The television receiver as claimed in claim 3 wherein said algorithm utilizes one of a selected value of a prior and a selected value of a cost function.

5. A television receiver for receiving and for calculating adaptive equalizer coefficients that comprises:
    means for using an algorithm that exploits sparsities in target weight vectors in an adaptive channel equalizer to increase a convergence rate of at least one adaptive equalizer coefficient wherein said means for using said algorithm further includes any one of:
    means for providing a sparse least mean squares algorithm of the form $$w_{k+1}^i = w_k^i + \mu(y_k - \hat{y}_k)x_k^i(|w_k^i| + \varepsilon)$$

where $w_k^i$ is the $i^{th}$ weight vector at time k, and where $w_{k+1}^i$ is the $i^{th}$ weight vector at time k+1, and where μ is the stepsize, and where $(y_k-\hat{y}_k)$ is a measured error at time k, and where $x_k^i$ is the $i^{th}$ value of received signal at time k, and where $(|w_k^i|+\epsilon)$ is a measure of sparsity contribution specified by a cost function;

means for providing a sparse constant modulus algorithm of the form $$w_{k+1}^i = w_k^i - \mu \hat{y}_k(\hat{y}_k - c)x_k^i(|w_k^i|^\alpha + \epsilon w)$$

where $w_k^i$ is the $i^{th}$ weight vector at time k, and where $w_{k+1}^i$ is the $i^{th}$ weight vector at time k+1, and where μ is the stepsize, and where $\hat{y}_k$ is a received signal at time k after passing through filter w, and where $(\hat{y}_k-c)$ is a calculated error at time k, and where $x_k^i$ is the $i^{th}$ value of received signal at time k, and where $(|w_k^i|^\alpha+\epsilon w)$ is a measure of sparsity contribution specified by a cost function; and means for providing a sparse decision directed algorithm of the form $$w_{k+1}^i = w_k^i - \mu(Q(\hat{y}_k) - \hat{y}_k)x_k^i(|w_k^i|^\alpha + \epsilon)$$

where $w_k^i$ is the $i^{th}$ weight vector at time k, and where $w_{k+1}^i$ is the $i^{th}$ weight vector at time k+1, and where μ is the stepsize, and where $\hat{y}_k$ is a received signal at time k after passing through filter w, and where $Q(\hat{y}_k)$ is a quantization of $\hat{y}_k$, and where $(Q(\hat{y}_k)-\hat{y}_k)$ is a calculated error at time k, and where $x_k^i$ is the $i^{th}$ value of received signal at time k, and where $(|w_k^i|^\alpha+\epsilon)$ is a measure of sparsity contribution specified by a cost function.

6. A method for calculating adaptive equalizer coefficients comprising the steps of:
calculating at least one adaptive equalizer coefficient with an algorithm that exploits sparsities in target weight vectors in an adaptive channel equalizer; and
increasing a convergence rate of said at least one adaptive equalizer coefficient, wherein said algorithm exploits sparsities in target weight vectors, without assuming the weights are positive and without assuming that weights sum to unity.

7. The method as claimed in claim 6 further comprising the step of:
providing said algorithm with one off a selected value of a prior information and a selected value of a cost function.

8. A method for calculating adaptive equalizer coefficients comprising the steps of:
calculating at least one adaptive equalizer coefficient with an algorithm that is capable of exploiting sparsities in target weight vectors in an adaptive channel equalizer;
increasing a convergence rate of at least one adaptive equalizer coefficient wherein said algorithm is any one of;
a sparse least mean squares algorithm of the form $$w_{k+1}^i = w_k^i + \mu(y_k - \hat{y}_k)x_k^i(|w_k^i| + \epsilon)$$

where $w_k^i$ is the $i^{th}$ weight vector at time k, and where $w_{k+1}^i$ is the $i^{th}$ weight vector at time k+1, and where μ is the stepsize, and where $(y_k-\hat{y}_k)$ is a measured error at time k, and where $x_k^i$ is the $i^{th}$ value of received signal at time k, and where $(|w_k^i|+\epsilon)$ is a measure of sparsity contribution specified by a cost function;

a sparse constant modulus algorithm of the form $$w_{k+1}^i = w_k^i - \mu \hat{y}_k(\hat{y}_k - c)x_k^i(|w_k^i|^\alpha + \epsilon w)$$

where $w_k^i$ is the $i^{th}$ weight vector at time k, and where $w_{k+1}^i$ is the $i^{th}$ weight vector at time k+1, and where μ is the stepsize, and where $\hat{y}_k$ is a received signal at time k after passing through filter w, and where $(\hat{y}_k-c)$ is a calculated error at time k, and where $x_k^i$ is the $i^{th}$ value of received signal at time k, and where $(|w_k^i|^\alpha+\epsilon w)$ is a measure of sparsity contribution specified by a cost function; and a sparse decision directed algorithm of the form $$w_{k+1}^i = w_k^i - \mu(Q(\hat{y}_k) - \hat{y}_k)x_k^i(|w_k^i|^\alpha + \epsilon)$$

where $w_k^i$ is the $i^{th}$ weight vector at time k, and where $w_{k+1}^i$ is the $i^{th}$ weight vector at time k+1, and where μ is the stepsize, and where $\hat{y}_k$ is a received signal at time k after passing through filter w, and where $Q(\hat{y}_k)$ is a quantization of $\hat{y}_k$, and where $(Q(\hat{y}_k)-\hat{y}_k)$ is a calculated error at time k, and where $x_k^i$ is the $i^{th}$ value of received signal at time k, and where $(|w_k^i|^\alpha+\epsilon)$ is a measure of sparsity contribution specified by a cost function.

9. Computer executable process steps, stored on a computer readable storage medium, for calculating adaptive equalizer coefficients comprising the steps of:
calculating at least one adaptive equalizer coefficient with an algorithm that exploits sparsities in target weight vectors in an adaptive channel equalizer; and
increasing a convergence rate of at least one adaptive equalizer coefficient, wherein said algorithm exploits target weight vectors, without assuming the weights are positive and without assuming that weights sum to unity.

10. The computer executable process steps, stored on a computer readable storage medium, as claimed in claim 9 further comprising the step of:
providing said algorithm with one of a selected value of a prior information and a selected value of a cost function.

11. Computer executable process steps, stored on a computer readable storage medium, for calculating adaptive equalizer coefficients comprising the steps of:
calculating at least one adaptive equalizer coefficient with an algorithm that exploits sparsities in target weight vectors in an adaptive channel equalizer;
increasing a convergence rate of at least one adaptive equalizer coefficient, wherein said algorithm is any one of;
a sparse least mean squares algorithm of the form $$w_{k+1}^i = w_k^i + \mu(y_k - \hat{y}_k)x_k^i(|w_k^i| + \epsilon)$$

where $w_k^i$ is the $i^{th}$ weight vector at time k, and where $w_{k+1}^i$ is the $i^{th}$ weight vector at time k+1, and where μ is the stepsize, and where $(y_k-\hat{y}_k)$ is a measured error at time k, and where $x_k^i$ is the $i^{th}$ value of received signal at time k, and where $(|w_k^i|+\epsilon)$ is a measure of sparsity contribution specified by a cost function;

a sparse constant modulus algorithm of the form $$w_{k+1}^i = w_k^i - \mu \hat{y}_k (\hat{y}_k - c) x_k^i (|w_k^i|^\alpha + \varepsilon w)$$

where $w_k^i$ is the $i^{th}$ weight vector at time k, and where $w_{k+1}^i$ is the $i^{th}$ weight vector at time k+1, and where μ is the stepsize, and where $\hat{y}_k$ is a received signal at time k after passing through filter w, and where $(\hat{y}_k-c)$ is a calculated error at time k, and where $x_k^i$ is the $i^{th}$ value of received signal at time k, and where $(|w_k^i|^\alpha+\epsilon w)$ is a measure of sparsity contribution specified by a cost function; and a sparse decision directed algorithm of the form $$w_{k+1}^i = w_k^i - \mu (Q(\hat{y}_k) - \hat{y}_k) x_k^i (|w_k^i|^\alpha + \varepsilon)$$

where $w_k^i$ is the $i^{th}$ weight vector at time k, and where $w_{k+1}^i$ is the $i^{th}$ weight vector at time k+1, and where μ is the stepsize, and where $\hat{y}_k$ is a received signal at time k after passing through filter w, and where $Q(y_k)$ is a quantization of $y_k$, and where $(Q(y_k)-y_k)$ is a calculated error at time k, and where $x_k^i$ is the $i^{th}$ value of received signal at time k, and where $(|w_k^i|^\alpha+\epsilon)$ is a measure of sparsity contribution specified by a cost function.

* * * * *